United States Patent

[11] 3,565,370

| [72] | Inventor | Waldemar Moller |
| | | Heiligenberg, Baden, Germany |
| [21] | Appl. No. | 742,593 |
| [22] | Filed | July 5, 1968 |
| [45] | Patented | Feb. 23, 1971 |
| [73] | Assignee | Fluggeratewerk Bodensee GmbH |
| | | Bodensee, Germany |
| [32] | Priority | July 25, 1967 |
| [33] | | Germany |
| [31] | | F53051 |

[54] AUTOMATIC FLIGHT CONTROL SYSTEM
3 Claims, 1 Drawing Fig.

[52] U.S. Cl. .................................................. 244/77;
318/18
[51] Int. Cl. ............................................... B64c 13/18
[50] Field of Search .......................................... 244/77, 77
(D), 77 (SE), 42.1; 318/20.050, 20.426, 20.430

[56] References Cited
UNITED STATES PATENTS

| 2,863,622 | 12/1958 | Ciscel | 244/77(D) |
| 3,241,027 | 3/1966 | Albright | 244/77(D)X |
| 3,412,300 | 11/1968 | Westenskow | 318/20.050 |

Primary Examiner—George E. A. Halvosa
Assistant Examiner—Jeffrey L. Forman
Attorney—Edward R. Hyde, Jr.

ABSTRACT: An aircraft flight control arrangement includes means for actuating a control surface in accordance with a signal representative of the combination of an attitude error signal and a control surface positional signal at relatively low control surface efficiency and with a signal representative of the combination of the attitude error signal and a control surface rate of change signal at relatively high control surface efficiency.

3,565,370
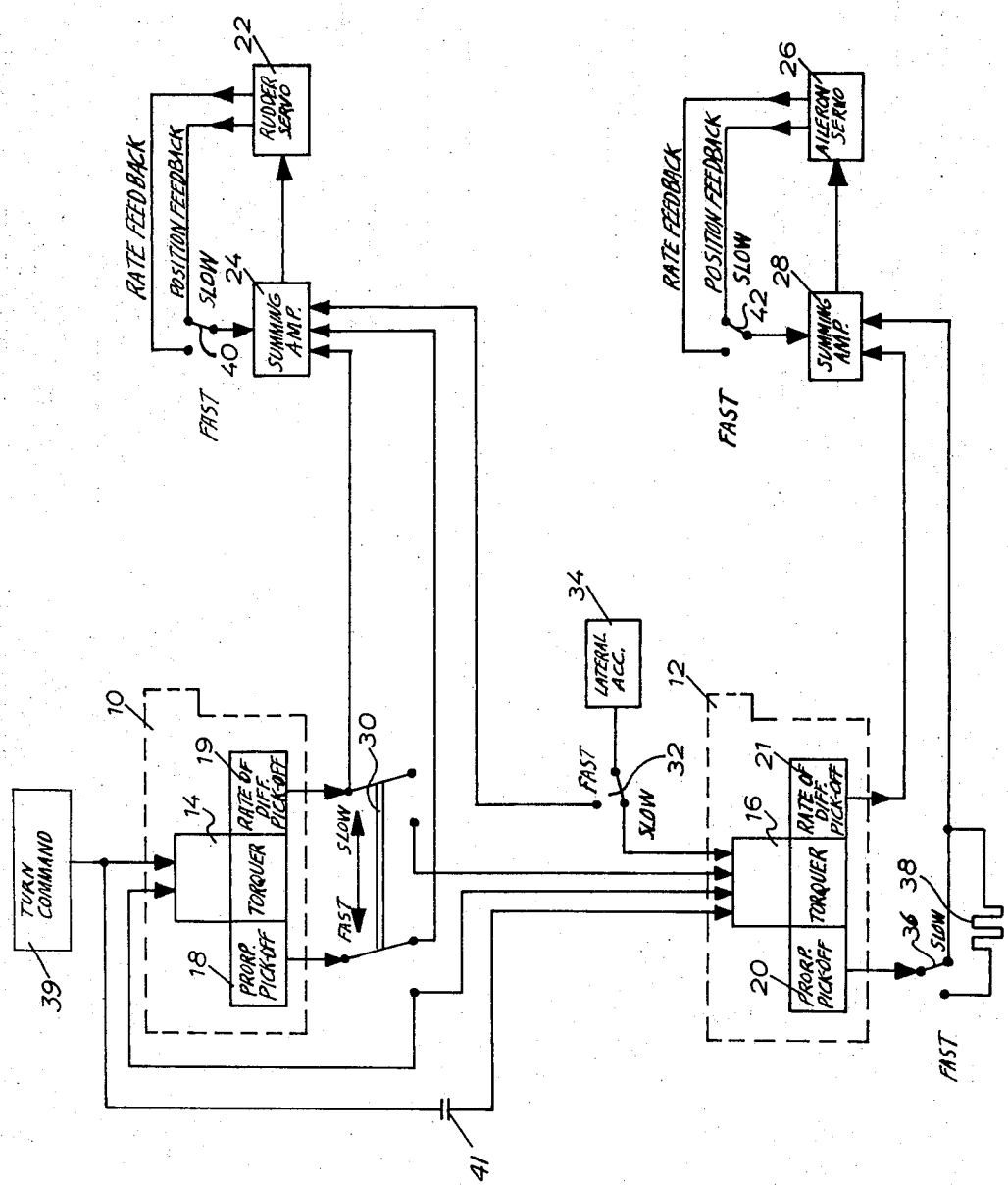
INVENTOR.
WALDEMAR MOLLER
BY
Frank J. Thompson

AUTOMATIC FLIGHT CONTROL SYSTEM

This invention relates to automatic flight control systems for aircraft.

In a known aircraft autopilot system, a gyroscope arrangement provides an error signal $e_1$ which is proportional to the deviation of the aircraft from a desired altitude about an axis of the aircraft. This error signal is combined with a signal $e_2$ and applied through a power amplifier to a servomotor for altering the position of a control surface of the aircraft in order to return the aircraft to the desired altitude. The signal $e_2$ is a negative feedback signal which is proportional to the control surface deflection or alternatively the motion of the servomotor drive means. With this arrangement a proportionality between aircraft deviation and rudder deflection is established and the ratio of the coefficients of proportionality is the gain of the control. Since the error signal is produced when the aircraft assumes a static deviation from the desired altitude, the error signal is available at both relatively low and relatively high control surface efficiencies corresponding to relatively low and relatively high airspeed for present day high performance aircraft.

In addition to the signal $e_2$, dynamic feedback signals representative of angular velocity and angular acceleration are produced. These signals increase in amplitude linearly with frequency and as the square of frequency, respectively, and are therefore substantially effective only at relatively high flight velocities. The dynamic signals exhibit a phase lead relative to altitude error signals and serve both to damp oscillations of the control loop and to compensate for lags of the servomotor movement.

In the range of relatively low control surface efficiency corresponding to low flight velocities, the dynamic signal lead is relatively small and does not provide for additional lags in the servomotor. The latter lag can be avoided by employing a constant negative feedback potential. On the other hand, within the range of relatively high control surface efficiency corresponding to relatively high flight velocity, the control surface deflection amplitude becomes substantially small and the feedback signal $e_2$ is correspondingly small. Transmission errors due to unavoidable backlash and elasticity in the control linkage can be a multiple of the control surface motion at these speeds. Thus, in high performance aircraft the control surface position feedback to the power amplifier input is made inoperative since it would be useless to control a servomotor to fractions of a degree while the transmission error to the control surface is an order of magnitude higher.

In order to avoid the operational disadvantages accompanying positional feedback, a rate of motion rather than a control surface position signal has been coupled as a feedback signal to the amplifier input. This system is highly insensitive to variations in control surface efficiency and in addition, effects with relatively small dynamic gain compensation for transmission errors through integration of the control signals by the servomotor. Further, due to a differentiation and therefore improved resolution of the servomotor motion, small control surface amplitudes are controlled more accurately than with the relatively coarse position feedback control. However, in the relatively low flight velocity range when the dynamic signal lead is relatively small, the phase lag of the servomotor is disadvantageous and causes adverse effects.

Accordingly it is an object of this invention to provide an improved automatic flight control system.

Another object of the invention is to provide an automatic flight control system having improved operating characteristics over a relatively large range of flight velocities and stabilizing frequencies.

In accordance with the general aspects of this invention, an aircraft flight control system includes means for generating an error signal representative of deviations of an aircraft from a desired altitude about an axis of the aircraft, a means for generating a signal representative of the position of a control surface thereof and which control surface is adapted for restoring the aircraft to the desired altitude, a means for generating a signal representative of the rate of change of position of the control surface, a means including a servomotor for varying the position of said control surface, and means for combining signals to form an excitation signal which is coupled to the servomotor. Switching means are provided for combining the positional signal at relatively low aircraft speed and for combining the rate of change signal with the error signal at relatively high speeds. In a particular arrangement, the switching means is adapted for coupling the positional signal to the combining means when landing flaps of the aircraft are in an operative position for controlling flight and for combining the rate of change signal with the error signal when the landing flaps are inoperative.

These and other objects and features of the invention will become apparent with reference to the following specifications and the drawing which is a block diagram illustrating one embodiment of an aircraft control arrangement of the present invention.

Referring now to the drawing, an automatic flight control arrangement is shown to comprise a yaw axis proportional, integrating and differentiation rate gyro represented by the dashed rectangle 10 and a similar gyro represented by the dashed rectangle 12 for the roll axis. The gyros 10 and 12 include a torquer 14 and 16 respectively by which a torque is exerted on the precession axis of the gyro. The gyros 10 and 12 also include a proportional pickoff 18 and 20 respectively, which provide an electrical signal proportional to the gyro deflection. The gyros 10 and 12 further include a rate of differential pickoff 19 and 20 respectively, which provides an electrical signal proportional to the time derivative of the deflection of the respective gyro. The deflection of each gyro is proportional to a linear combination of precession torque and time integral thereof. A servomotor 22 for the rudder, not illustrated, is energized through an amplifier 24. A servomotor for the ailerons, not illustrated, is energized through an amplifier 28.

The signal from the rate pickoff 19 of gyro 10 is coupled to the amplifier 24, which is a summing amplifier. In addition, the amplifier 24 receives the signal from the proportional pickoff 18 of gyro 10, through a two position switch 30 in the position "slow flight" thereof, and a signal from a lateral accelerometer 34, through a two position switch 32 in the position "fast flight" thereof.

The amplifier 28 which is also a summing amplifier receives a signal from the rate pickoff 21 of the gyro 12 and a signal from the proportional pickoff of this gyro. The latter signal is supplied through a switch 36 by which a resistor 38 can be series connected into the signal circuit. The signals applied to the torquer 16 of the roll gyro 12 include a turn command signal which is derived from a source 39 and is differentiated by a capacitor 41. This signal is also coupled to the torquer 14 of the gyro 10. In addition to the turn command signal there is also applied to the gyro 12 output signals of the proportional pickoff and the rate pickoff of gyro 10 in the switch position "fast flight" of switch 30, as well as a signal from the lateral accelerometer 34 in the switch position "slow flight" of switch 32.

A feedback is provided from the servomotor 22 to the summing amplifier 24. This is done through a two point switch 40 either as a position feedback or as a rate feedback. The deflection of the rudder is thereby made proportional to the sum signal appearing at the input of the amplifier 24 of the rate of setting. Thus, in one position of the switch 40 a position feedback or, in the other position, a rate feedback for the rudder is obtained. Similarly a feedback from the servomotor 26 of the ailerons to the amplifier 28 is switched over through a switch 42 from positional feedback at a slow flight to rate feedback at a fast flight. In the former case, the aileron deflection is proportional to the sum signal effective at the input of amplifier 28, in the latter case the rate of setting of the ailerons.

At slow flight the switches 40 and 42 are in the right-hand switch position, as illustrated, with positional feedback, whereas at fast flight they switch over into the left-hand position with rate feedback. Preferably, this switching over can be effected simultaneously with the switching over of the switches 30, 32 and 36. The appropriate moment for the switching over is the lowering of the landing flaps, and the switching over can be automatically coupled therewith.

The system described operates in the following manner. In the position "slow flight" the stabilization about the yaw axis (angle X) is effected by means of the rudder. The signals from the proportional and rate pickoffs of gyro 10 are fed to the rudder amplifier 24. The stabilization about the roll or fore-and-aft axis (angle Y) is effected by the ailerons. The signals from the proportional and rate pickoffs of gyro 12 are fed to the amplifier 28. In both cases, there is a positional feedback signal from the control surface deflection to the amplifier input signal. A turn command is supplied to the torquer 14 of the yaw gyro 10 and at the same time, differentiated and fed to the torquer 16 of the roll gyro. The differentiated signal causes the aircraft to roll into bank, while the signal on the torquer 14 produces a continued rotation of the aircraft about the yaw axis, as long as the turn command lasts. If the turn coordination achieved thereby should not yet be complete, a correction is effected by the lateral accelerometer through switch 32 as described in German Pat. No. 1,196,969.

At relatively high flight speeds, the output signals of gyro 10 from the proportional and rate of difference pickoffs are decoupled from the rudder amplifier 24 by switch 30 and are applied to the torquer 16 of the roll gyro 12. An error signal from gyro 10 caused by the turn command initially causes a torque on gyro 12 and a bank altitude. At the same time the differentiated turn command is fed also directly to the torquer through capacitor 41. This control procedure is subject matter of my earlier filed U.S. Pat. application Ser. No. 700,140, filed Jan. 24, 1968 and assigned to the assignee of the present invention. In addition, a signal from the rate pickoff of the gyro 10 is applied to the rudder for stabilization. Furthermore, a lateral acceleration signal is coupled thereto through switch 32 in the position "fast flight" in order that an exact turn coordination is effected through the rudder. The proportional and rate pickoffs 20 and 21 respectively of gyro 12 continue to control the ailerons. However, the proportional pickoff is coupled to the amplifier 28 through a resistor 38. In addition, both ailerons and rudder are switched over to rate feedback signal by switches 42 and 40 respectively. Because the proportional component of the signal is switched off through switch 30 in one case, while it is attenuated through the switch 36 and the resistor 38 in the other case, the danger of hunting with the rate feedback is avoided.

While I have illustrated and described a particular embodiment of my invention, it will be understood that various modifications may be made therein without departing from the spirit of the invention and the scope of the appended claims.

I claim: 1. In a flight control arrangement for an aircraft including an aircraft altitude control surface, a drive means coupled to the control surface for varying the position thereof in accordance with an energizing signal applied to said drive means, means for combining input signals and for applying an energizing signal representative of the combination to the drive means, means including a gyroscope adapted for applying an error signal representative of the deviation of the aircraft from an altitude about an axis of the aircraft to said signal combining means, means providing a feedback signal representative of the position of said control surface and a feedback signal representative of a rate of change of position of the surface, the improvement comprising switching means for alternatively applying said positional feedback signal to the signal combining means at relatively low flight speeds and for applying said rate feedback signal to said signal combining means at relatively high flight speeds.

2. The flight control arrangement of claim 1 wherein the aircraft includes extendable and retractable landing flap control surface and wherein said switching means for alternatively applying said feedback signal to said signal combining means is adapted for alternatively applying said positional feedback signal to said combination means upon extension of the flap and for applying said rate feedback signal upon retraction of said flap.

3. The flight control arrangement of claim 1 wherein said gyroscope means include means for generating a proportional signal and a rate signal and switching means for coupling said proportional and rate signals of said gyroscope to said signal combining means at relatively slow flight speeds and for decoupling the proportional signal from said combination means at relatively high flight speeds.